Feb. 25, 1947.   J. N. HELTZEL   2,416,584
CONCRETE EXPANSION JOINT
Filed Sept. 7, 1944
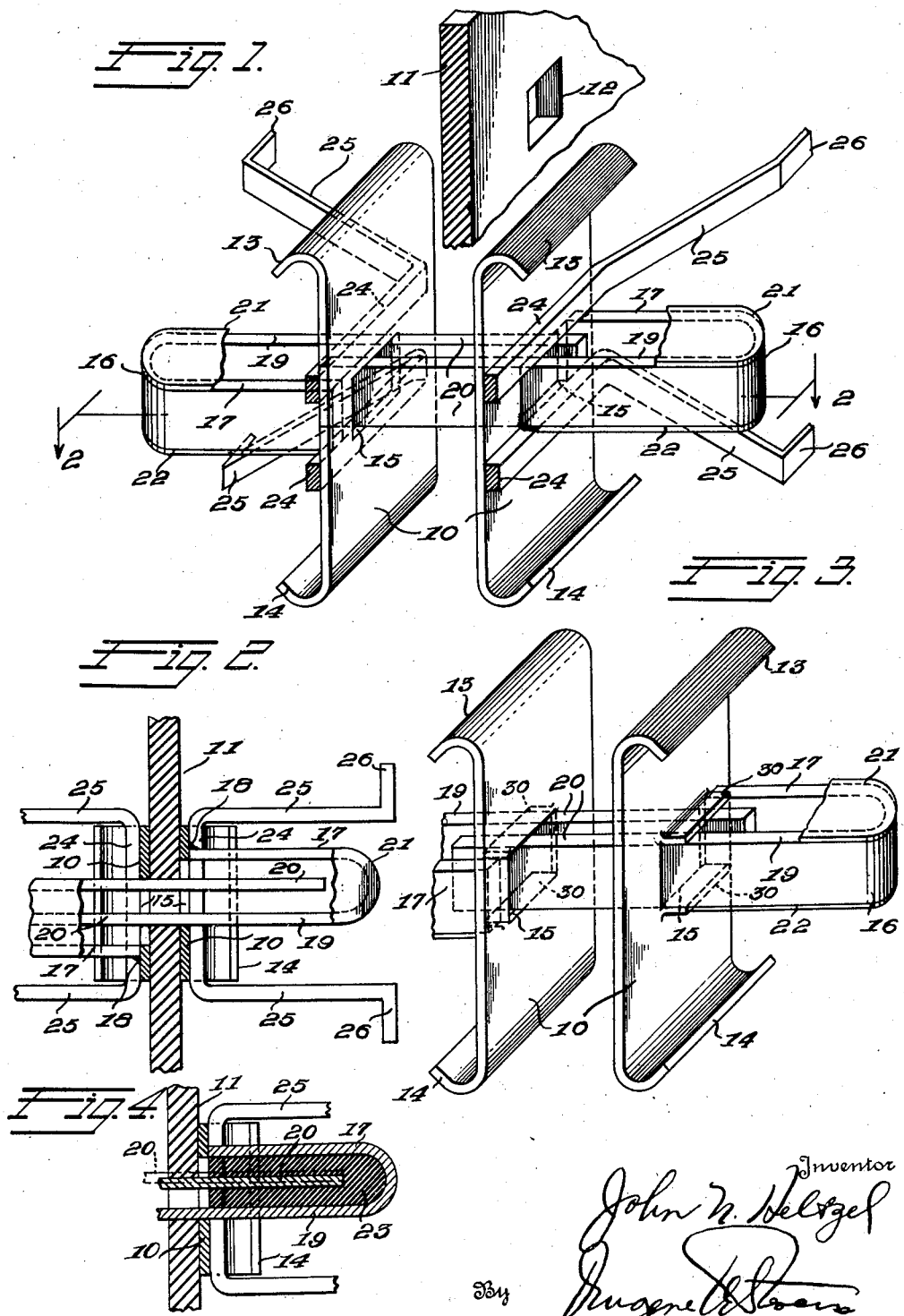

Patented Feb. 25, 1947

2,416,584

UNITED STATES PATENT OFFICE 2,416,584

CONCRETE EXPANSION JOINT

John N. Heltzel, Warren, Ohio

Application September 7, 1944, Serial No. 553,058

11 Claims. (Cl. 94—18)

This invention relates to load transfer means for paving joints, and is more particularly concerned with improved dowel structures embodying cooperating dowel and socket means in opposed paving sections of an expansion joint therein, and wherein the dowel is movable in the socket incident to contraction or expansion of adjacent paving sections.

Structures of this kind as heretofore proposed or used embody opposed shear plates embedded in adjacent edges of opposed concrete sections with an apertured expansion strip disposed between the shear plates, a dowel socket carried by one of the shear plates for projection into the corresponding paving section and opening through an aperture in the shear plate, and a dowel carried by the other shear plate projecting through the aperture and into the socket of the first shear plate for relative movement of the shear plates transversely at their respective planes to permit expansion and contraction of the paving sections while at the same time providing load transfer connections therebetween.

In accordance with my Patent No. 2,365,550, dated Dec. 19, 1944 (Application filed January 24, 1934), such structures embody opposed shear plates each having a rectangular aperture and a dowel socket carried thereby opening through the rectangular aperture, and a dowel supported by each shear plate for projection into the socket of the other shear plate whereby the dowels are capable of free movement lengthwise thereof for contraction and expansion of opposed paving sections.

In structures of this kind it is important that the dowels have a movement relative to opposed shear plates for relative horizontal movement of the plates lengthwise of the dowels, but it is equally important that relative vertical movement of the plates be precluded in order to avoid sagging or buckling of the joints.

In structures of the character above referred to, the shear plates, usually of generally rectangular form, are constructed of relatively thin metal and as the upper and lower edges of the dowels engage the upper and lower edges of the plate apertures to preclude the aforementioned relative vertical movement a very restricted bearing area is provided for the dowels, due to the relatively thin shear plates and due to the substantial pressure of each dowel, particularly on the lower aperture edge, excessive wear may develop with a resultant looseness as to permit the objectionable relative vertical movement between the opposed shear plates.

While the upper and lower walls of the sockets are usually flush with the upper and lower edges of the apertures, such walls are usually of thin metal and are provided only for the provision of sockets in pouring of the concrete, and accordingly such walls cannot be relied upon as effective bearing supports for the dowels.

It is also important in structures of this kind that the dowels be rigidly supported by the shear plates, particularly in instances where the shear plates are not provided with means in the form of stress relieving elements extending into and embedded in the concrete. This importance is due to the fact that while the dowels are usually well embedded in the concrete the shear plates are embedded only in the edge surfaces of opposed concrete sections and are subject to substantial lateral strain upon movement of the dowels through the apertures therein.

It is furthermore important for most effective operating conditions that the lower edges of the plate apertures be reinforced to preclude distortion of the plates in such locations.

In conformity with the above noted desirable requirements in structures of this kind, it is a primary object of this invention to provide an improved shear plate of relatively thin material having a dowel receiving rectangular aperture, and bearing surfaces adjacent the upper and lower edges of the aperture of a width substantially greater than the thickness of the plate.

A further object of the invention is the provision of a shear plate of relatively thin material having a dowel receiving rectangular aperture therein, and means rigid with the plate adjacent the upper and lower margins of the aperture for reinforcing the plate.

A still further object of the invention is the provision of a shear plate of relatively thin material having a dowel receiving rectangular aperture therein, a dowel for projection through an aperture in a cooperating plate extending through the aperture of the first plate adjacent one side thereof, and means for rigidly securing the dowel to the plate adjacent the margin of the aperture.

With the above and other objects in view, as will hereinafter appear, the invention comprises the combinations and arrangements of parts hereinafter set forth and illustrated in the accompanying drawing of preferred embodiments of the invention, from which the several features of the invention and the advantages attained thereby will be readily understood by those skilled in the art.

In the accompanying drawing—

Figure 1 is a perspective view partly broken away, disclosing the invention in accordance with one embodiment thereof;

Figure 2 is a broken horizontal section on the line 2—2, Fig. 1;

Figure 3 is a broken perspective view depicting a further embodiment of the invention.

Figure 4 is a fragmentary sectional view similar to Fig. 2 showing resilient material filling the socket between the relatively movable legs so as to exclude concrete, etc.

The load transfer means herein disclosed is generally of the construction according to one of the embodiments disclosed in my application Serial No. 553,057, filed September 7, 1944, modified in accordance with a feature of my invention as disclosed in application Serial No. 553,059, filed September 7, 1944, in that the load transfer means is adapted to permit expansion or contraction of paving sections universally in a horizontal plane.

As indicated in Figs. 1 and 2, the present invention in accordance with a first embodiment thereof comprises opposed shear plates 10 adapted for embodiment in the edge surfaces of opposed paving sections with an expansion strip 11 interposed therebetween, and which expansion strip is provided with a dowel receiving aperture 12.

Each shear plate 10 is of generally rectangular form and of relatively thin material and is provided with upper and lower retaining flanges 13 and 14 respectively. Each shear plate 10 is further provided with a rectangular aperture 15. A bar rectangular in cross section and of substantially greater depth than width is associated with each plate, and each such bar comprises a U-shaped portion 16 disposed at one side of the plate and including a leg 17 welded or otherwise rigidly secured to the plate adjacent one side of the aperture as at 18 (Fig. 2), and another leg 19 extending through the aperture in contact with the other side thereof. The leg 19 is continued on the opposite side of the plate in the provision of a dowel 20 for slidable reception in the aperture of the opposing plate, the depth of the aperture being substantially of the vertical dimension of the dowel for bearing engagement of the upper and lower edge surfaces of the dowel with the upper and lower edge walls of the aperture to preclude relative vertical movement of the plates.

The U-shaped bar portions are provided with upper and lower cover plates 21 and 22 respectively thereby providing socket members for receiving the dowels, it being understood of course that in operative position the flanges 13 and 14 and the sockets are embedded in the concrete or other paving material with the adjacent faces of the shear plates flush with the adjacent edge surfaces of the paving sections between which the strip is disposed with dowels 20 extending through the aperture 12.

The structure thus far described is substantially as in my application Serial No. 553,057, filed September 7, 1944. In the application just referred to, however, the dowels have horizontal movement relative to the opposing shear plates in one direction only, that is, in the direction of their lengths.

As disclosed in Figs. 1 and 2, the plate apertures 15 are of substantial width and the legs 17 and 19 of the U-shaped portions 16 are correspondingly spaced, whereby the legs of opposed plates as well as the dowels are substantially spaced in the direction of the width of the plates, thereby providing for lateral movement of the dowels as well as longitudinal movement in the apertures and sockets of the opposed shear plates.

So far as the essential features of the present invention are concerned, the dowels may have movement in one direction only, as in said application. The present invention, however, makes provision for increased bearing for the dowels on the upper and lower edge surfaces of the plate apertures in the provision of bars 24 which are rectangular in cross section and which extend transversely of the plates 10 and are suitably rigidly secured thereto with their adjacent edge surfaces flush with the upper and lower edge surfaces of the apertures 15, whereby substantially wide bearing surfaces are provided for the dowels, as is clearly indicated in Figs. 1 and 2. The width of the bars may, of course, be varied to provide any desired width of bearing surface.

The bars 24 are preferably extended at both ends thereof in the form of stress relieving members 25 which extend substantially at right angles to the bars with those of the upper bars projecting upwardly and those of the lower bars projecting downwardly. The members 25 preferably terminate in retaining tongues 26. In the provision of the bars 24 the dowels 20 have substantial bearing contact with the upper and lower edges of the apertures whereby wear is reduced with a consequent maintenance of a sliding fit to prevent relative vertical movement of the plates.

The bars 24 further function to reinforce the plates which are otherwise weakened in the provision of the apertures 15. The bar legs 19 extending through the apertures 15 are preferably rigidly secured to the plates as by welding, and the provision of the plates provides appreciably greater welding area which is true of the legs 17 also.

In the provision for relative lateral movement of the dowels the apertures 15 of the two plates 10 do not have their lateral edges alined, as can be seen in Fig. 2. However, the plate and dowel structures are alike and are reversible whereby the same are capable of manufacture and installation of a substantially less cost than if the plate and dowel structures for opposite sides of an expansion joint were of unlike construction and non-interchangeable.

A modified embodiment of the invention is disclosed in Fig. 3 wherein parts corresponding to like parts in Figs. 1 and 2 are designated by like reference characters.

In this embodiment the widened bearing surfaces are provided with flanges 30 which are preferably formed by bending out the material of the plates above and below the apertures, as is clearly illustrated. These flanges like the bars 24 also function to reinforce the plates 10 adjacent the apertures.

If desired, suitable stress relieving members may be secured to the flanges.

While I have disclosed two embodiments of means for providing increased bearing surfaces on opposed edges of dowel receiving apertures associated with specific plate and dowel structures, it is to be understood that such means are capable of use with other forms of load transfer structures, such for example, in structures where only one of the plates is provided with an aperture and the other plate provided with a dowel, or in structures where the dowels and cooperating sockets are disposed adjacent opposite side edges of the plates.

As shown in the sectional view of Fig. 4, the socket members, which are closed by the cover plates 21 and 22, may be filled with a suitable resilient material such as rubber, asphalt, etc., as indicated by the numeral 23, so as to exclude concrete when in a fluid state. The filling material 23 will permit relative longitudinal and transverse movement between the legs 19 and 20 as is indicated generally by the dotted lines in this figure.

While I have disclosed certain specific embodiments of my invention, such are to be considered as illustrative only, and not restrictive, the scope of the invention being defined in the annexed claims.

What I claim and desire to secure by U. S. Letters Patent is:

1. Load transfer means for use in expansion joints between concrete sections comprising a pair of shear plates of relatively thin material adapted for embodiment in opposed edges of the sections in opposed relation and in vertical position with an apertured expansion strip therebetween, a rectangular aperture in each plate, a bar rectangular in cross section extending through the aperture in each plate adjacent a side edge thereof, one end portion of each bar being of U-shape having an end secured to the respective plate adjacent the other side edge of the aperture, the other end portion of each bar providing a dowel for projection through the aperture of the opposing plate, and into the U-shaped portion thereof, and means rigid with each plate providing bearing surfaces for the upper and lower edges of the dowels of a width substantially greater than the thickness of the plates.

2. The structure according to claim 1 together with plates secured to the upper and lower edges of the U-shaped portions and defining therewith sockets for receiving the dowels.

3. The structure according to claim 1 wherein said apertures are of a width and the inner parallel walls of the U-shaped portions are so spaced as to provide for lateral movement of the dowels relative to the opposing shear plates.

4. The structure according to claim 1 wherein said means comprises a bar rectangular in cross section rigidly secured to each plate adjacent the upper and the lower edge of the aperture with adjacent edges of the bars flush with the corresponding edges of the aperture.

5. The structure according to claim 1 wherein said means comprises flanges integral with each plate and projecting outwardly of the aperture therein adjacent the upper and lower edges thereof.

6. A load transfer means for an expansion joint between two concrete sections, comprising a dowel element embedded in one concrete section, a socket member embedded in the other section and spaced from the said first section by an interposed expansion strip, whereby to permit longitudinal movement of the sections on expansion and contraction thereof, said socket member being substantially wider than said dowel and providing a space on each side of the latter whereby the dowel can rock horizontally in the socket, and a resilient filler material within said socket element at each side of the dowel element to permit lateral movement of the sections, and to exclude foreign matter from said socket.

7. Load transfer means for use in an expansion joint between opposed paving sections comprising a shear plate of relatively thin material for embedment in vertical position in the edge wall of each section, a rectangular aperture in one of said plates, a socket member carried by said last plate opening through the aperture therein, a dowel rectangular in cross-section rigidly supported by the other shear plate for projection through said aperture and into said socket member, the upper and lower edges of the dowel engageable with the upper and lower edge walls of the aperture, and means rigidly supported by said first plate and having a portion providing a lower dowel bearing surface flush with the lower edge of said aperture and of a width substantially greater than the thickness of the plate, there being other portions of said plate supported means spaced away from the plate and anchored in the associated paving section.

8. The structure according to claim 7, together with means rigidly supported by the first plate and having a portion providing an upper dowel bearing surface flush with the upper edge of said aperture and of a width substantially greater than the thickness of the plate.

9. A shear plate for use in concrete section expansion joints comprising a substantially rectangular member of relatively thin material, a rectangular dowel receiving aperture in the plate having upper and lower dowel bearing edge surfaces in operative vertical position of the plate, means rigid with the plate providing extended dowel bearing surfaces along said edge surfaces, said means providing a stress-relieving anchor extending laterally of said plate, and stress-relieving elements rigid with and projecting from said means away from the plate in a lateral direction beyond said aperture.

10. Load transfer means for use in an expansion joint between opposed paving sections comprising a shear plate of relatively thin material for embedment in vertical position in the edge wall of each section, a rectangular aperture in one of said plates, a socket member carried by said last plate opening through the aperture therein, a dowel rectangular in cross-section rigidly supported by the other shear plate for projection through said aperture and into said socket member, the upper and lower edges of the dowel engageable with the upper and lower edge walls of the aperture, and a bar rectangular in cross section extending transversely of and rigidly supported by said first plate with its upper wall flush with the lower surface of said aperture, said bar being of a cross-section substantially greater than the thickness of said first plate and providing a lower dowel bearing surface.

11. Load transfer means for use in an expansion joint between opposed paving sections comprising a shear plate of relatively thin material for embedment in vertical position in the edge wall of each section, a rectangular aperture in one of said plates, a socket member carried by said last plate opening through the aperture therein, a dowel rectangular in cross-section rigidly supported by the other shear plate for projection through said aperture and into said socket member, the upper and lower edges of the dowel engageable with the upper and lower edge walls of the aperture, means rigidly supported by said first plate and having a portion providing a lower dowel bearing surface flush with the lower edge of said aperture and of a width substantially greater than the thickness of the plate, and means rigidly supported by the first plate and having a portion providing an upper dowel bearing surface flush with the upper edge of said aperture and of a width substantially greater than the thickness of the plate, there being other portions of said plate supported means spaced away from the plate and anchored in the associated paving section.

JOHN N. HELTZEL.

REFERENCES CITED

The following references are of record in the file of this patent:

UNITED STATES PATENTS

| Number | Name | Date |
|---|---|---|
| 2,121,303 | Robertson | June 21, 1938 |
| 2,261,602 | Yeoman | Nov. 4, 1941 |
| 2,280,455 | Seuberling | Apr. 21, 1942 |
| 2,095,060 | Geyer | Oct. 5, 1937 |